US006430922B2

(12) United States Patent
Tohji

(10) Patent No.: US 6,430,922 B2
(45) Date of Patent: Aug. 13, 2002

(54) CONSTRUCTION MACHINE

(75) Inventor: Yutaka Tohji, Hiroshima (JP)

(73) Assignee: Kobelco Construction Machinery Co., Ltd., Hiroshima (JP)

( * ) Notice: Subject to any disclaimer, the term of this patent is extended or adjusted under 35 U.S.C. 154(b) by 0 days.

(21) Appl. No.: 09/833,625

(22) Filed: Apr. 13, 2001

(30) Foreign Application Priority Data

Apr. 13, 2000 (JP) ....................................... 2000-112340

(51) Int. Cl.[7] ............................................. F16D 31/02
(52) U.S. Cl. ......................................... 60/421; 91/448
(58) Field of Search .......................... 60/421, 422, 426, 60/427; 91/448

(56) References Cited

U.S. PATENT DOCUMENTS

| | | | | |
|---|---|---|---|---|
| 5,052,179 A | * | 10/1991 | Fujii | 60/421 |
| 5,063,739 A | | 11/1991 | Bianchetta et al. | |
| 5,083,428 A | * | 1/1992 | Kubomoto et al. | 60/421 |
| 5,481,872 A | | 1/1996 | Karakama et al. | |
| 5,692,377 A | * | 12/1997 | Moriya et al. | 60/421 |
| 5,970,709 A | * | 10/1999 | Tohji | 60/421 |
| 6,148,548 A | | 11/2000 | Tohji | |

FOREIGN PATENT DOCUMENTS

| | | |
|---|---|---|
| EP | 0 381 328 | 8/1990 |
| JP | 6-123302 | 5/1994 |

* cited by examiner

*Primary Examiner*—John E. Ryznic
(74) *Attorney, Agent, or Firm*—Oblon, Spivak, McClelland, Maier & Neustadt, P.C.

(57) ABSTRACT

When simultaneous operation of rotating and arm pulling is detected by a detector, a switching controller recognizes that both signals are output simultaneously, and switches a switching valve to a second position, so that oil flows discharged from a plurality of hydraulic pumps are united and supplied to a rotating motor and an arm cylinder. A meter-in flow controller restricts a quantity of oil supplied to the arm cylinder. Thereby, even where rotating and arm pulling are operated simultaneously, each of operations can be done quickly, and the delay of the rotating operation is overcome, to enable proper rotating and arm pulling operations.

9 Claims, 3 Drawing Sheets

METER-IN THROTTLE CHARACTERISTIC VIEW

METER-OUT THROTTLE CHARACTERISTIC VIEW

CONSTRUCTION MACHINE

CROSS REFERENCE TO RELATED APPLICATIONS

The present application is based on Japanese patent application 2000-112340 filed on Apr. 13, 2000, which is herein incorporated by reference.

BACKGROUND OF THE INVENTION

1. Field of the Invention

The present invention relates to a construction machine such as a hydraulic excavator. Particularly, the invention relates to a hydraulic control circuit provided in the construction machine.

2. Description of the Background

In the past, where excavation work is carried out by a hydraulic excavator, earth and sand scooped by a bucket are loaded on a dump truck waiting behind the hydraulic excavator by rotating an upper rotating body of the excavator. The operation is carried such that when loading onto the dump truck is terminated, an excavator arm is turned while elevated, and returned to an excavation point.

The conventional hydraulic control circuit is designed so that oil is supplied from a common pump to a control valve for an arm and a control valve for rotating. Because of this, the arm, which has the smaller load, is first operated, so that the rotating operation is delayed.

In this case, an operator has to carry out a complicated operation in which an arm operating lever is operated moderately, to provide sufficient oil pressure for the rotating operation. The complicated operation is difficult to do unless an operator is a skilled person. However, when pulling and rotating of the arm are carried out while adjusting an operating lever, there occurs a problem that rerotating to the excavation point is delayed to lower the work efficiency.

To cope with the foregoing, control has been carried out so that a valve for throttling a quantity of oil discharged from an arm cylinder at the time of an arm pulling operation is provided to overcome the delay of the rotating operation during the arm pulling operation. However, in this hydraulic control circuit, since the valve is provided in a circuit on the rod side of an arm cylinder, even if throttling is done relatively strongly, a sufficient throttling effect could not be a obtained. The digging equipment herein denoted in simplified manner as an "excavator arm," as a rule comprises an integral single boom or a boom in two parts, plus a shovel stem and an excavating implement.

SUMMARY OF THE INVENTION

It is an object of the present invention to provide a construction machine capable of carrying out a rotating operation and an excavator arm operation properly even if both the rotating and the arm pulling are operated simultaneously.

In accordance with at least an aspect of the invention, the above and other objects are addressed by a rotating motor for causing a rotating operation such as a rotating operation of an upper rotating body. The arm operation comprises an operating such as arm pulling and arm-in, wherein "arm-in" means bringing in the excavator arm. Actuators include an arm cylinder for causing an excavator arm operation. Control valves control supply and discharge of oil between each of hydraulic pumps and each of the actuators. The control valves incline a control valve for a rotating motor and a control valve for an arm cylinder. A switching valve is switched between a first position for separately supplying oil from the hydraulic pumps to the control valve for the rotating motor and the control valve for the arm cylinder, and a second position for uniting and supplying oil from the hydraulic pumps. A detector outputs signals responsive to the rotating operation and the arm pulling operation respectively when those operations are carried out. A switching controller switches the switching valve to the second position when the signals are output substantially simultaneously. A meter-in flow-controller such as meter-in flow-control valve restricts a quantity of oil supplied to the arm cylinder when the switching valve is switched to the second position.

In this case, when rotating and arm pulling are operated simultaneously, signals are respectively output from the detector and applied to the switching controller. The switching controller recognizes that the signals are output simultaneously, and switches the switching valve to the second position. When the switching valve is switched to the second position, oil flows discharged from the plurality of hydraulic pumps are united and supplied to the rotating motor and the arm cylinder through a specific control valve. Accordingly, the quantity of oil supplied to the rotating motor and the arm cylinder is increased. Thereby, the quantity of oil necessary for quickly carrying out the rotating and arm pulling operations is secured.

In this state, the meter-in flow-controller restricts the quantity of oil supplied to the arm cylinder, so that the arm pulling speed can be suppressed. Accordingly, even if the rotating and arm pulling are operated simultaneously, respective operations of the rotating and the arm pulling can be done quickly, the delay of the rotating operation can be overcome, and the rotating and arm pulling operations can be realized properly.

Preferably, the meter-out flow controller is provided for restricting a quantity of oil discharged from the arm cylinder when the switching valve is switched to the second position.

In this case, when the quantity of oil supplied to the arm cylinder is throttled, the meter-out flow controller also simultaneously throttles the quantity of oil from the arm cylinder. Accordingly, cavitation can be prevented when, for example, the arm descends by its own weight without any operation.

DESCRIPTION OF THE PREFERRED EMBODIMENTS

Figure 1:
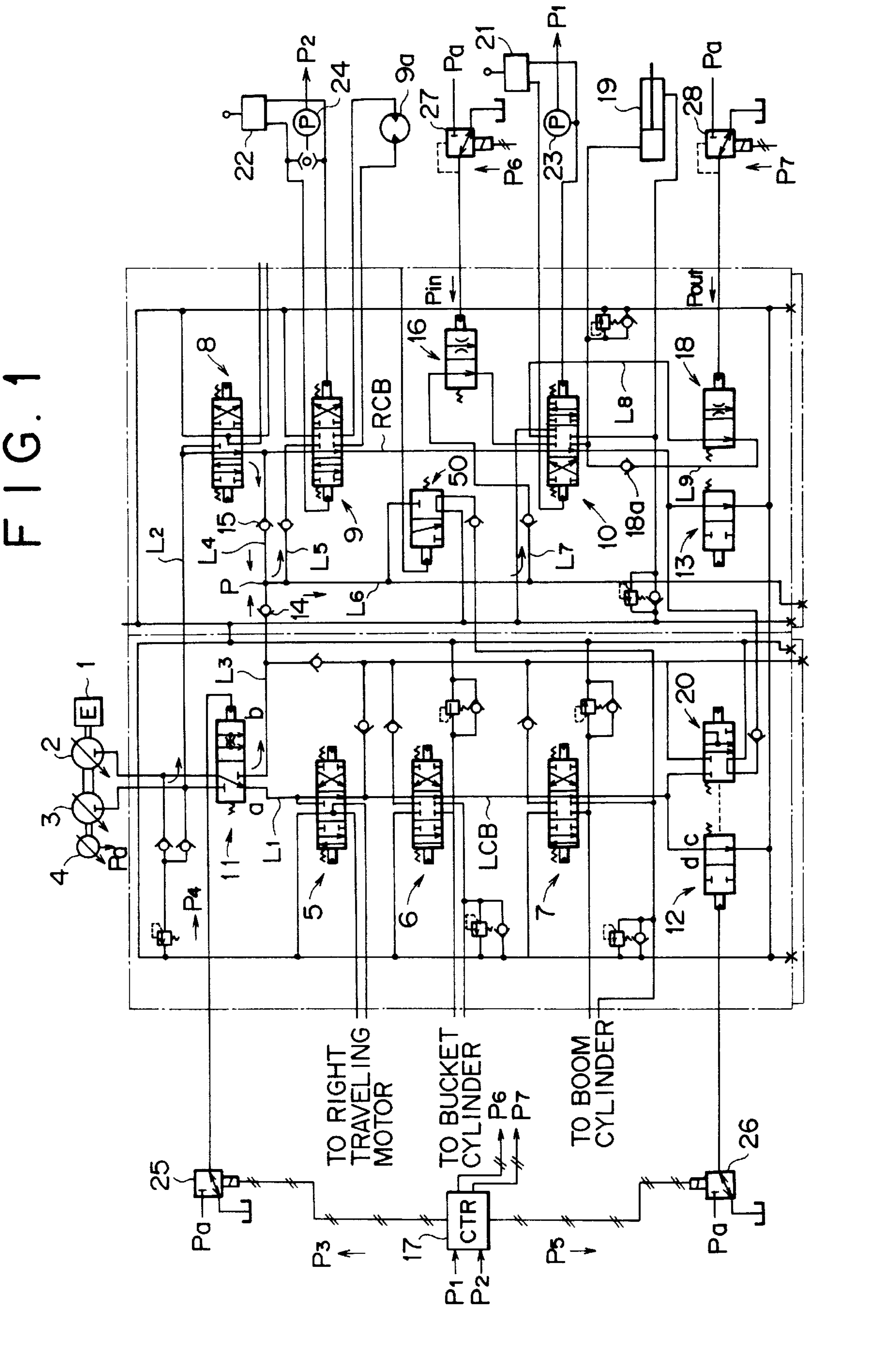
FIG. 1 is a hydraulic circuit view of a construction machine according to one embodiment of the present invention.

The present invention will be described in detail hereinafter on the basis of one embodiment of the invention shown in the drawings.

FIG. 1 shows one embodiment where a hydraulic control circuit of the construction machine according to the present invention is applied to a hydraulic excavator.

In the figure, when an engine 1 is driven, a first hydraulic pump 2, a second hydraulic pump 3 and a pilot pump 4 are driven, respectively. The first and second hydraulic pumps 2 and 3, as plural pumps, are variable capacity type hydraulic pumps. These pumps are swash plate type axial piston pumps whose discharge flow rate changes on the basis of a displacement of an angle of inclination of a swash plate.

Oil discharged from the first and second hydraulic pumps 2 and 3 is supplied to direction control valves arranged in a left center bypass line (sometimes abbreviated as LCB), and to direction control valves arranged in a right center bypass line (sometimes abbreviated as RCB). The control valves arranged in the LCB include a control valve 5 for a right traveling motor, a control valve 6 for a bucket cylinder and a control valve 7 for a boom cylinder. The control valves arranged in the RCB include a control valve for a left traveling motor 8, a control valve 9 for a rotating motor and a control valve 10 for an arm cylinder.

Further, pilot pressure discharged from the pilot pump 4 is utilized as a pressure source Pa for various controls.

A travel straight valve 11 as a switching valve is interposed in an upstream oil path L1 of the control valve for the right traveling motor 5. The travel straight valve 11 has a position a as a first position and a position b as a second position. Normally, it is held at the position a.

At the position a, oil discharged from the first hydraulic pump 2 is supplied to the LCB side through the oil path L1. On the other hand, oil discharged from the second hydraulic pump 3 is supplied to the RCB side through the oil path L2. Accordingly, oil is supplied respectively from the first hydraulic pump 2 and the second hydraulic pump 3 to the control valve for a right traveling motor 5 and the control valve for a left traveling motor 8.

For example, when the boom or the arm is operated in the state that the left and right operating levers (not shown in the figure) are operated to the same position, the travel straight valve 11 is switched from the position a to the position b. Oil discharged from the first hydraulic pump 2 is distributed and supplied to the control valve for a rotating motor 9, and the control valve for an arm cylinder 10 through the oil path L3.

At that time, oil discharged from the second hydraulic pump 3 flows to the oil paths L1 and L2 in parallel, and is supplied to the left and right control valves for a traveling motor 5 and 8. Thereby, for example, even where a composite operation such that the boom is risen and fallen while driving the traveling motor, oil discharged from the second hydraulic pump 3 is equally supplied to the left and right traveling motors. Accordingly, the travel straightness can be held.

Further, a cut valve 12 is provided downstream of the control valve for a boom cylinder 7 in the LCB. On the other hand, a cut valve 13 is provided downstream of the control valve for an arm cylinder 10 in the RCB.

The cut valve 12 performs a closing operation when the control valve on the RCB side is operated. On the other hand, the cut valve 13 performs a closing operation when the control valves on the LCB side are operated. The reason is as follows: When the travel straight valve 11 is switched to the position a, oil discharged from the second hydraulic pump 3 is branched to the oil paths L1 and L2. This is because when either of control valves on the RCB side is operated, pump pressure is not created unless the cut valve 12 on the LCB side is closed. On the other hand, when either of control valves on the LCB side is operated, pump pressure is not created unless the cut valve 13 on the RCB side is closed.

The oil path L3 is connected, at a united point P, to united oil path L4 branched from downstream end of the control valve for a traveling motor 8 in the RCB. Oil is supplied to the control valve for a rotating motor 9 through an oil path L5 extended from the united point P. Further, oil is supplied to the control valve for an arm cylinder 10 through oil paths L6 and L7 extended from the united point P. Numerals 14 and 15 in the oil paths L3 and L4 denote check valves. In the figure, numeral 9*a* denotes a rotating motor for rotating an upper rotating body.

In the oil path L7, there is provided a flow rate control valve 16 as meter-in flow-control valve for restricting or throttling a quantity of oil in a meter-in circuit in the control valve for an arm cylinder 10. The flow rate control valve 16 is controlled by a controller 17 as a switching control means.

Further, in an oil path L8 downstream of the control valve for an arm cylinder 10, there is provided a flow rate control valve 18 as meter-out flow-control valve for throttling a quantity of oil in a meter-out circuit in the control valve for an arm cylinder 10. It is likewise controlled by the controller 17. An oil path L9 downstream of the flow rate control valve 18 is fed back to a head-side oil chamber of an arm cylinder 19 through a check valve 18*a*. This constitutes a reproducing circuit for increasing an arm speed. In the figure, numeral 20 denotes an arm-push united valve for accelerating arm-pushing. Likewise, numeral 50 denotes a boom-lift united valve for accelerating boom-lifting.

The meter-in circuit and the meter-out circuit are so designed as to be throttled or restricted respectively when the rotating and the arm-pulling are operated simultaneously. The throttling effect depends on an inflow flow rate of oil. The inflow flow rate depends on a rotational frequency of an engine. Accordingly, when the rotational frequency of the engine falls to lower the quantity of discharge of the pump, the throttling effect lowers. Therefore, where a solenoid proportional valve 27 for applying a meter-in throttle hydraulic signal $P_{in}$ to the flow rate control valve 16 and a solenoid proportional valve 28 for applying a meter-out throttle signal $P_{out}$ to the flow rate control valve 18 are controlled, throttle signals P6 and P7 according to the rotational frequency of the engine are commanded from the controller 17.

Figure 2:
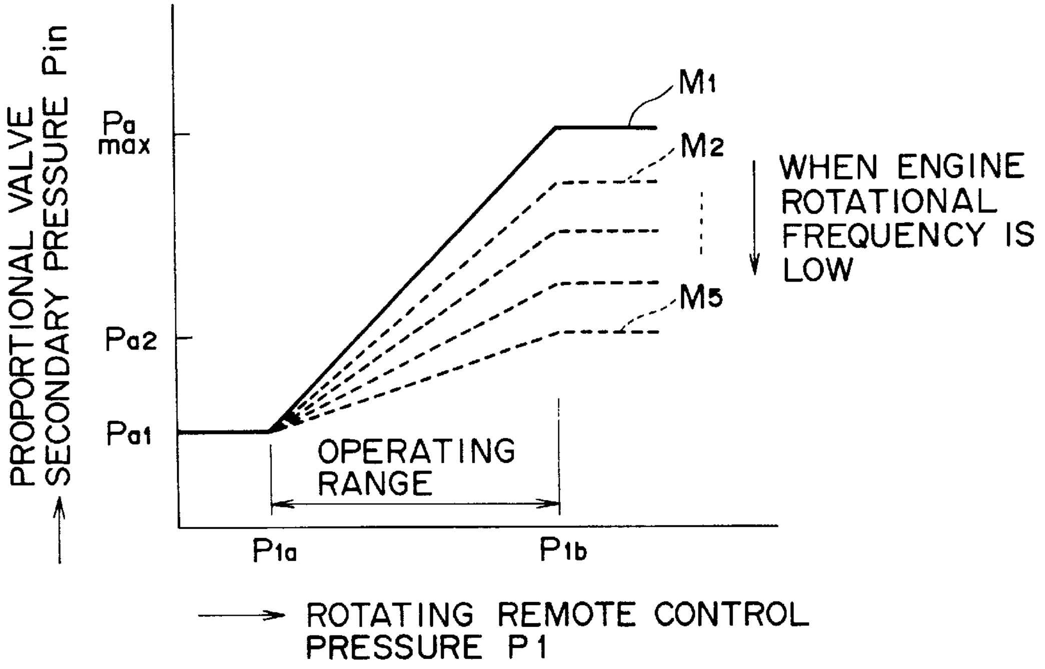
FIG. 2 is a meter-in throttle characteristic view of an arm cylinder shown in FIG. 1.

FIG. 2 shows a characteristic view of the meter-in throttle hydraulic signal $P_{in}$. In the operating range in which rotating remote control pressure $P_1$ of a remote control valve for rotating 22 changes from $P_{1a}$ to $P_{1b}$, when the engine is rated-operated, the meter-in throttle hydraulic signal $P_{in}$ output from the solenoid proportional valve 21, that is, the so called proportional valve secondary pressure, increases from $P_{a1}$ to $P_{amax}$. As the rotational frequency of the engine falls, the characteristics is lowered from M1 to M5 stepwise until the maximum secondary pressure assumes a pressure $P_{a2}$ according to the decrease of the rotational frequency of the engine. Thereby, the throttling effect is relieved stepwise.

Figure 3:
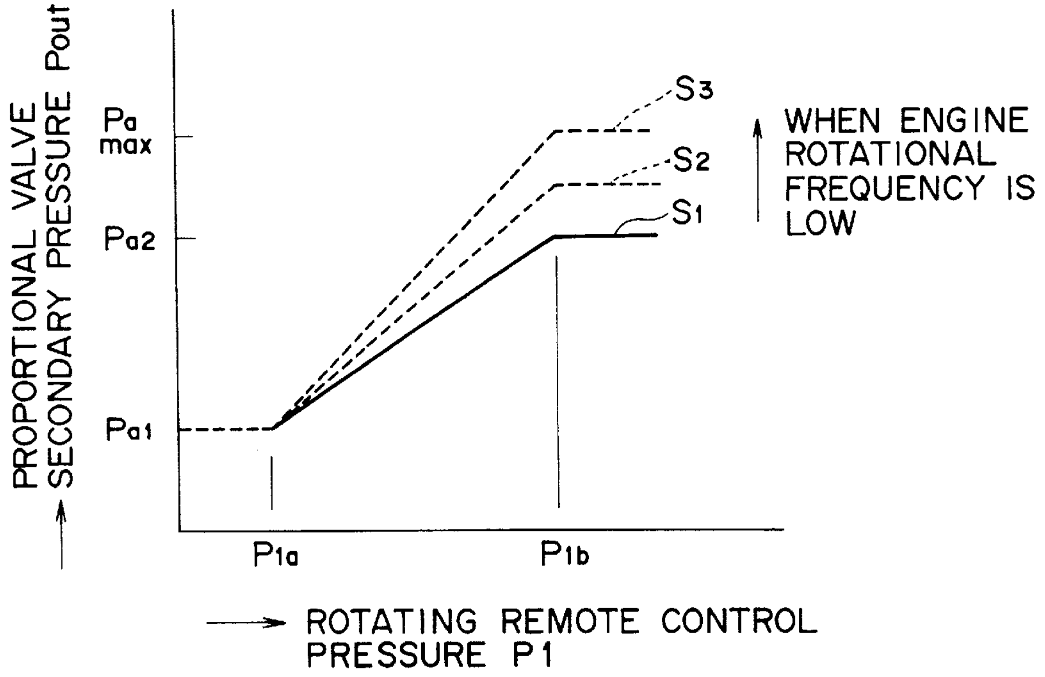
FIG. 3 is likewise a meter-out throttle characteristic view.

FIG. 3 shows a characteristic view of a meter-out throttle hydraulic signal $P_{out}$. In the operating range in which remote control pressure $P_1$ changes from $P_{1a}$ to $P_{1b}$, when the engine is rated-operated, the meter-out throttle hydraulic signal $P_{out}$ output from the solenoid proportional valve 28, that is, the so called proportional valve secondary pressure, increases from $P_{a1}$ to $P_{a2}$. As the rotational frequency of the engine falls, the characteristic pressure is increased from S1 to S3 stepwise till the maximum secondary pressure assumes a value according to decrease of the rotational frequency of the engine, conversely to the characteristics shown in FIG. 2. Thereby, cavitations can be prevented.

In the above-described constitution, when the remote control pressure rises, the proportional secondary pressure rises in proportion thereto and the flow rate control valve 16 is throttled. Alternatively, an inverse proportion may be made in which when the rotating remote control pressure rises, the proportional secondary pressure falls and the flow rate control valve 16 is throttled.

Figure 4:
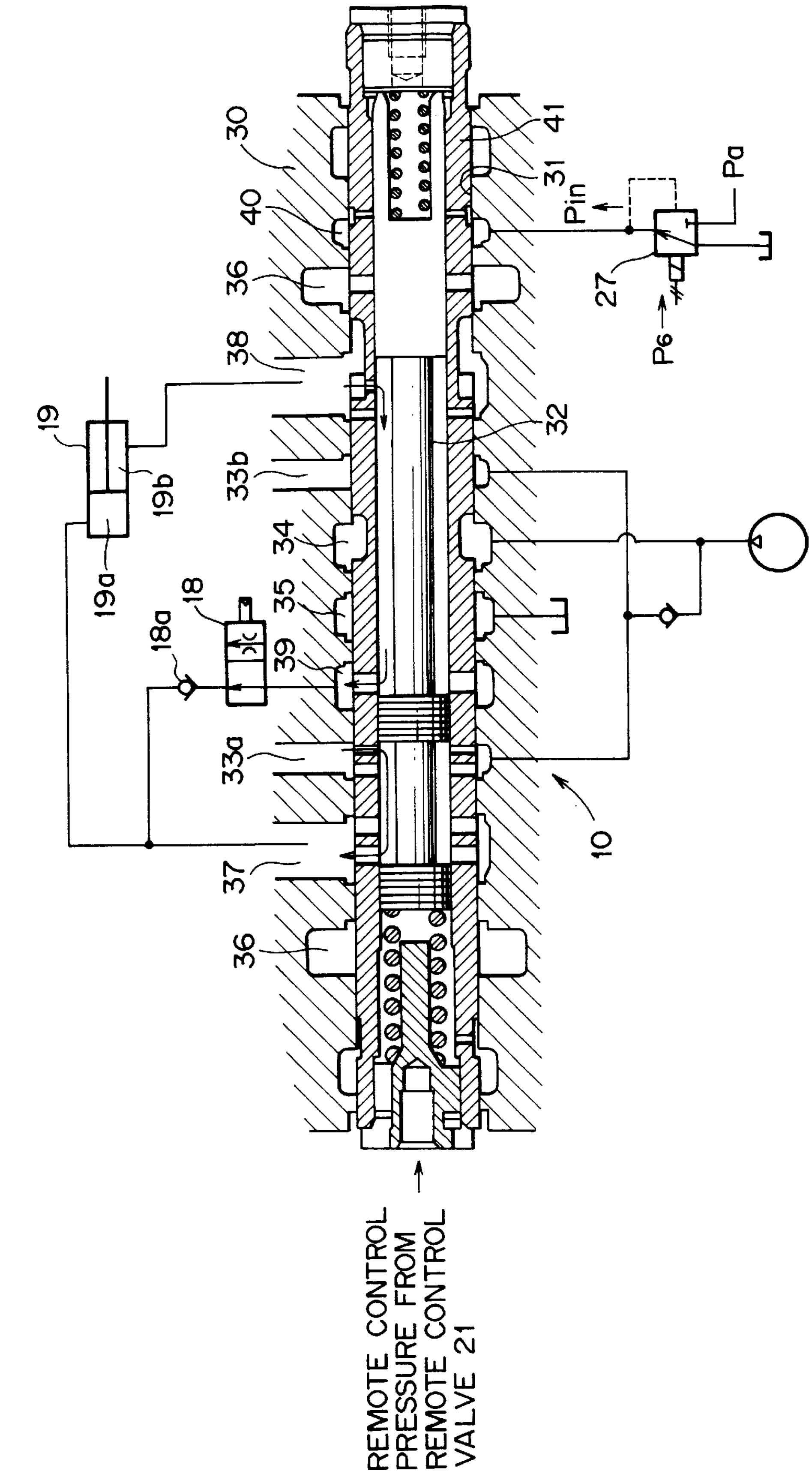
FIG. 4 is a sectional view showing the constitution in which an adjusting valve for adjusting a meter-in flow rate is housed in an arm spool.

FIG. 4 shows the constitution in which the flow rate control valve 16 is housed in the control valve 10 for an arm cylinder.

In the figure, a bore 31 extends through a housing 30. An arm spool 32 and an auxiliary arm spool for throttling 41 constituting a flow rate control valve 16 are slidably inserted into the bore 31 and in the outer periphery of the arm spool 32, respectively. The housing 30 is internally formed with pump ports 33*a*, 33*b* connected to the hydraulic pump, bleed-off ports 34, 35 constituting the center bypass passage RCB, and a tank port 36. Oil introduced from the pump port 33*a* is discharged from the head port 37 and supplied to a head-side oil chamber 19*a* of the arm cylinder 19. Oil discharged from a rod-side oil chamber 19*b* of the arm cylinder 19 is introduced into the rod port 38 and discharged from a reproducing port 39. Then the oil is supplied to the head-side oil chamber 19*a* through the flow rate control valve 18.

On the right hand side of the housing 30, there is provided a pilot port 40 into which is introduced a meter-in throttle hydraulic signal $P_{in}$ from the solenoid proportional valve 27. The auxiliary spool 41 is operated by the signal $P_{in}$ so as to throttle the meter-in flow rate of the inflow flow rate. Alternately, remote control pressure of the remote control valve for rotating 22 in place of a hydraulic signal from the solenoid proportional valve 27 may be input into the port 40 directly.

As described above, according to the constitution in which the flow rate control valve 16 for throttling a meter-in circuit is housed in the control valve for an arm cylinder 10, the hydraulic circuit becomes simple, and the space is also saved.

In the following, the operation of the hydraulic control circuit having the above-described constitution will be described. In the following description of operation, a description will be made of a case where after earth and sand are loaded on the dump truck, the arm is rotated while being elevated, and returned to the excavation point.

An operator simultaneous operates the remote control valve 21 for an arm 19 and the remote control valve 22 for rotating simultaneously start arm pulling and rotating. At that time, an arm pulling signal $P_1$ and a rotating signal $P_2$ are respectively output from a pressure sensor 23 and a pressure sensor 24 as detection means for detecting remote control pressure and applied to the controller 17.

The controller 17 judges if both the signals $P_1$ and $P_2$ are input, to thereby recognize simultaneous operation of arm pulling and rotating. When the simultaneous operation is recognized, a united signal $P_3$ is output to the solenoid proportional valve 25. The solenoid proportional valve 25 applies a switching hydraulic signal P4 to the control port of the travel straight valve 11 to switch the travel straight valve 11 from the position a to the position b.

At the same time, a united signal P5 is output to the solenoid proportional valve 26. The solenoid proportional valve 26 switches the cut valve 12 from a position c (open) to a position d (closed).

At that time, oil discharged from the first hydraulic pump 2 is supplied to the RCB through the passage L3. On the other hand, oil discharged from the second hydraulic pump 3 is supplied to the LCB through the passage L1.

The oil discharged from the second hydraulic pump 3 is branched to the oil path L2 also. The oil further flows into the united oil path L4 through the center bypass of the control valve for a left traveling motor 8. Accordingly, oil flows of both the hydraulic pumps 2 and 3 are united at the united point P. However, it is assumed that the control valves on the LCB are not operated.

In this state, the operating levers of the remote control valve for an arm 21 and the remote control valve for rotating 22 are deeply operated. At that time, an increase in operating pressure in the remote control valve for rotating 22 is detected by the pressure sensor 24 and applied to the controller 17. The controller 17 outputs throttle signals P6 and P7 according to operating pressures detected to the solenoid proportional valves 27 and 28, respectively. Thereby, opening degrees of the low rate control valves 16 and 18 are respectively throttled. As a result, the meter-in circuit and the meter-out circuit of the control valve for an arm cylinder 10 are throttled to prevent the oil united at the united point P from preferentially flowing to the control valve for an arm cylinder 10. Accordingly, the control valve for a rotating motor 9 and the control valve for an arm cylinder 10 can be operated properly.

Further, where the rotational frequency of the engine falls to lower the discharge quantity of the pump, the following operation for preventing the lowering of the throttling effect is carried out, as mentioned above. That is, the throttling of the meter-in circuit is relieved according to the rotational frequency of the engine, and the throttling of he meter-out circuit is increased. Thereby, cavitation is prevented.

According to the embodiments of the present invention, the meter-in flow controller and the meter-out flow controller are designed so that the quantity of oil supplied to the arm cylinder is restricted according to the amplitude of a signal output by the rotating operation. Therefore, the quantity of oil supplied to the rotating motor and the arm cylinder in the simultaneous operation of rotating and arm pulling can be kept to the desired ratio. Accordingly, even an unskilled person can perform the rotating and arm pulling operations simply.

Further, the meter-in flow-controller and the meter-out flow-controller are designed so that the restriction characteristics can be changed according to the rotational frequency of the engine. Therefore, the fixed restricting effect corresponding to the variation of the rotational frequency of the engine is obtained. Thereby, cavitation can be prevented.

In the present embodiment, in realizing a circuit capable of simultaneously operating the rotating and arm pulling, the travel straight valve 11 is utilized. However, the effect of the present invention is exhibited even with a different circuit for providing the united oil path L4. The flow rate control valve 16 for throttling the meter-in circuit of the arm cylinder 19 can be constituted by changing a land shape of an arm spool.

That is, in the present embodiment, there are left and right traveling motors as actuators, and both traveling control valves for controlling both traveling motors as control valves. Further, there is provided a hydraulic control circuit of a construction machine using, as a switching valve, a traveling control valve which is switched between a first position for independently supplying oil from separate hydraulic pumps to both traveling control valves and a second position for supplying oil from a singe hydraulic pump in parallel.

While in the present embodiment, the hydraulic control circuit of the present invention has been described taking a hydraulic excavator as an example, the invention is not limited thereto. The invention can be applied to a suitable construction machine, which is provided with an arm and turns an upper rotating body.

While one embodiment of the present invention has been disclosed, the scope of protection of the present invention is not limited thereto.

Obviously, numerous modifications and variations of the present invention are possible in light of the above teachings. It is therefore to be understood that within the scope of the appended claims, the invention may be practiced otherwise than as specifically described herein.

What is claimed is:

1. A construction machine comprising:

a rotating motor for causing a rotating operation of a part of the construction machine;

actuators including an arm cylinder for causing operation of an arm of the construction machine;

a plurality of hydraulic pumps;

control valves positioned and adapted to control supply and discharge of oil between the hydraulic pumps and each of the actuators, said control valves including a control valve for the rotating motor and a control valve for the arm cylinder;

a switching valve switchable between a first position and a second position, wherein the switching valve is positioned and adapted such that when the switching valve is in the first position the switching valve separately supplies oil from the hydraulic pumps to the control valve for the rotating motor and the control valve for the arm cylinder, and when the switching valve is in the second position the switching valve unites the oil from the hydraulic pumps;

a detector adapted to output signals responsive to a rotating operation and an arm operation, respectively;

a switching controller adapted to receive the output signals from the detector, and to switch the switching valve to the second position when signals responsive to a rotating operation and an arm operation are output substantially simultaneously; and a meter-in flow controller adapted to restrict a quantity of oil supplied to the arm cylinder when the switching valve is switched to the second position.

2. The construction machine according to claim 1, further comprising a meter-out flow controller adapted to restrict a quantity of oil discharged from the arm cylinder when the switching valve is switched to the second position.

3. The construction machine according to claim 2, wherein said meter-in flow controller and said meter-out flow controller are adapted to control a quantity of throttling according to the magnitude of said rotating operation.

4. The construction machine according to claim 1, wherein said construction machine has an engine, and wherein said meter-in flow controller is adapted to change throttle characteristics according to a rotational frequency of the engine.

5. The construction machine according to claim 2, wherein said construction machine has an engine, and wherein said meter-out flow controller is adapted to change throttle characteristics according to a rotational frequency of the engine.

6. The construction machine according to claim 1, wherein said meter-in flow controller is housed in said control valve for the arm cylinder.

7. The construction machine according to claim 1, further comprising:

left and right traveling motors;

traveling motor control valves for controlling said traveling motors; and wherein said switching valve is adapted to switch between independently supplying oil from said hydraulic pumps to both said traveling motor control valves in said first position, and supplying oil from a single hydraulic pump in said second position.

8. In a hydraulic control circuit comprising:

a plurality of actuators including a rotating motor for causing a rotating operation of a part, and an arm cylinder for causing an arm operation;

a plurality of hydraulic pumps;

control valves positioned and adapted to control supply and discharge of oil between the hydraulic pumps and each of the actuators, said control valves including two control valves for the rotating motor and a control valve for the arm cylinder;

a switching valve switchable between a first position and a second position, wherein the switching valve is positioned and adapted such that when the switching valve is in the first position the switching valve separately supplies oil from the hydraulic pumps to the control valves for the rotating motor and the control valve for the arm cylinder, and when the switching valve is in the second position the switching valve unites the oil from the hydraulic pumps;

detectors adapted to output signals when the rotating and the arm operation are carried out;

a switching controller adapted to switch said switching valve to said second position when the rotating and arm operation signals are output simultaneously, and a meter-in throttle adapted to throttle a quantity of oil supplied to said arm cylinder when said switching valve is switched to said second position.

9. A construction machine comprising:

a rotating motor for causing a rotating operation of a part of the construction machine;

actuators including an arm cylinder for causing operation of an arm of the construction machine;

a plurality of hydraulic pumps;

control valves positioned and adapted to control supply and discharge of oil between the hydraulic pumps and each of the actuators, said control valves including a control valve for the rotating motor and a control valve for the arm cylinder;

a switching valve means positionable in a first position for separately supplying oil from the hydraulic pumps to the control valve for the rotating motor and the control valve for the arm cylinder, and positionable in a second position for uniting the oil from the hydraulic pumps;

detector means for outputting signals responsive to a rotating operation and an arm operation, respectively;

switching controller means for receiving the output signals from the detector, and for switching the switching valve means to the second position when signals responsive to a rotating operation and an arm operation are output substantially simultaneously; and meter-in flow control means for restricting a quantity of oil supplied to the arm cylinder when the switching valve means is switched to the second position.

* * * * *